(12) United States Patent
Li

(10) Patent No.: US 12,118,007 B2
(45) Date of Patent: Oct. 15, 2024

(54) INCREMENTAL DATA RETRIEVAL BASED ON STRUCTURAL METADATA

(71) Applicants: Atlassian PTY Ltd., Sydney (AU); Atlassian US, Inc., San Francisco, CA (US)

(72) Inventor: Shuai Li, Sunnyvale, CA (US)

(73) Assignees: Atlassian PTY Ltd., Sydney (AU); Atlassian US, Inc., San Francisco, CA (US)

(*) Notice: Subject to any disclaimer, the term of this patent is extended or adjusted under 35 U.S.C. 154(b) by 79 days.

(21) Appl. No.: 16/564,425

(22) Filed: Sep. 9, 2019

(65) Prior Publication Data
US 2021/0073235 A1 Mar. 11, 2021

(51) Int. Cl.
*G06F 16/2457* (2019.01)
*G06F 16/16* (2019.01)

(52) U.S. Cl.
CPC ...... *G06F 16/24573* (2019.01); *G06F 16/164* (2019.01)

(58) Field of Classification Search
CPC ............. G06F 16/24573; G06F 16/164; G06F 16/2471; G06F 16/9024; G06F 16/2425
See application file for complete search history.

(56) References Cited

U.S. PATENT DOCUMENTS

| | | | |
|---|---|---|---|
| 10,268,735 B1* | 4/2019 | White | G06F 16/24578 |
| 10,742,593 B1* | 8/2020 | Vasquez | H04L 67/1097 |
| 2015/0046492 A1* | 2/2015 | Balachandran | G06F 8/36 707/772 |
| 2017/0093976 A1* | 3/2017 | Raghunath | H04L 67/1008 |
| 2018/0329958 A1* | 11/2018 | Choudhury | G06F 16/2343 |
| 2020/0107253 A1* | 4/2020 | Albasheir | H04L 65/80 |
| 2020/0404081 A1* | 12/2020 | Iizuka | H04L 43/16 |

* cited by examiner

*Primary Examiner* — Brittany N Allen
*Assistant Examiner* — William P Bartlett
(74) *Attorney, Agent, or Firm* — Alston & Bird LLP

(57) ABSTRACT

Systems and methods provide techniques for incremental data retrieval using structural metadata. In one embodiments, a method includes identifying a query definition model associated with the data retrieval query, transmitting a respective data retrieval request to each data source to obtain a per-source portion of a plurality of requested data nodes that is associated with the data source; and upon obtaining each particular per-source portion, updating a query processing model for the data retrieval query based on the particular per-source portion, determining a model completeness measure for the updated query processing model, determining whether the model completeness measure satisfies one or more completeness threshold criteria, and in response to determining that the model completeness measure satisfies the one or more completeness threshold criteria, generating a partial query output for the data retrieval query based on the updated query processing model.

18 Claims, 15 Drawing Sheets

```
1  query {
2    Project(id: "ABC132654") {
3      projectAuthor {
4        authorName
5        authorLogoID
6      }
7      projectStartDate
8      projectQualityScore
9    }
10 }
```

| Leaf Data Node | DS1 | DS2 | DS3 |
|---|---|---|---|
| projectStartDate 703 | YES | YES | NO |
| projectQualityScore 704 | NO | YES | YES |
| authorName 705 | NO | NO | YES |
| authorLogoID 706 | YES | YES | YES |

FIG. 10

| Leaf Data node | DS1 <u>801</u> | DS2 <u>802</u> | DS3 <u>803</u> |
|---|---|---|---|
| projectStartDate <u>703</u> | 2 milliseconds | 3 milliseconds | ∞ |
| projectQualityScore <u>704</u> | ∞ | 1 millisecond | 4 milliseconds |
| authorName <u>705</u> | ∞ <u>1101</u> | ∞ | 2 milliseconds |
| authorLogoID <u>706</u> | 1 millisecond <u>1103</u> | 3 milliseconds <u>1102</u> | 6 milliseconds <u>1104</u> |

1300 authorName:
"David_Johnson"
1301

INCREMENTAL DATA RETRIEVAL BASED ON STRUCTURAL METADATA

BACKGROUND

Various methods, apparatuses, and systems are configured to provide techniques for database retrieval in distributed database environments. Applicant has identified many deficiencies and problems associated with existing methods, apparatuses, and systems for database retrieval in distributed database environments. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable database retrieval in distributed data environments. For example, certain embodiments of the present invention provide methods, apparatuses, systems, computing devices, and/or the like that are configured to enable database retrieval in distributed database systems using at least one of query definition models, incrementally-updated query processing models, model completeness measures for query processing models, per-source node retrieval latency measures, etc.

In accordance with one aspect, a method is provided. In one embodiment, the method comprises: identifying a query definition model associated with a data retrieval query, wherein the query definition model defines one or more requested hierarchical relationships between a plurality of requested data nodes for the data retrieval query; transmitting a respective data retrieval request to each data source of a plurality of data sources to obtain a per-source portion of the plurality of requested data nodes that is associated with the data source; and upon obtaining each particular per-source portion from a particular data source of the plurality of data sources, updating a query processing model for the data retrieval query based on the particular per-source portion, wherein the query processing model comprises one or more retrieved data items, determining a model completeness measure for the updated query processing model, wherein the model completeness measure for the updated query processing model indicates a structural similarity measure between a modeling structure of the query definition model and a processing structure of the query processing model, determine whether the model completeness measure satisfies one or more completeness threshold criteria, and in response to determining that the model completeness measure satisfies the one or more completeness threshold criteria, generating a selected portion of the one or more retrieved data items as a partial query output for the data retrieval query.

In accordance with another aspect, a computer program product is provided. The computer program product may comprise at least one computer-readable storage medium having computer-readable program code portions stored therein, the computer-readable program code portions comprising executable portions configured to: identify a query definition model associated with a data retrieval query, wherein the query definition model defines one or more requested hierarchical relationships between a plurality of requested data nodes for the data retrieval query; transmit a respective data retrieval request to each data source of a plurality of data sources to obtain a per-source portion of the plurality of requested data nodes that is associated with the data source; and upon obtaining each particular per-source portion from a particular data source of the plurality of data sources, update a query processing model for the data retrieval query based on the particular per-source portion, wherein the query processing model comprises one or more retrieved data items, determine a model completeness measure for the updated query processing model, wherein the model completeness measure for the updated query processing model indicates a structural similarity measure between a modeling structure of the query definition model and a processing structure of the query processing model, determine whether the model completeness measure satisfies one or more completeness threshold criteria, and in response to determining that the model completeness measure satisfies the one or more completeness threshold criteria, generate a selected portion of the one or more retrieved data items as a partial query output for the data retrieval query.

In accordance with yet another aspect, an apparatus comprising at least one processor and at least one memory including computer program code is provided. In one embodiment, the at least one memory and the computer program code may be configured to, with the processor, cause the apparatus to: identify a query definition model associated with a data retrieval query, wherein the query definition model defines one or more requested hierarchical relationships between a plurality of requested data nodes for the data retrieval query; transmit a respective data retrieval request to each data source of a plurality of data sources to obtain a per-source portion of the plurality of requested data nodes that is associated with the data source; and upon obtaining each particular per-source portion from a particular data source of the plurality of data sources, update a query processing model for the data retrieval query based on the particular per-source portion, wherein the query processing model comprises one or more retrieved data items, determine a model completeness measure for the updated query processing model, wherein the model completeness measure for the updated query processing model indicates a structural similarity measure between a modeling structure of the query definition model and a processing structure of the query processing model, determine whether the model completeness measure satisfies one or more completeness threshold criteria, and in response to determining that the model completeness measure satisfies the one or more completeness threshold criteria, generate a selected portion of the one or more retrieved data items as a partial query output for the data retrieval query.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6:

FIG. 6 provides an operational example of a data retrieval query, in accordance with at least some embodiments of the present invention.

Figure 7:
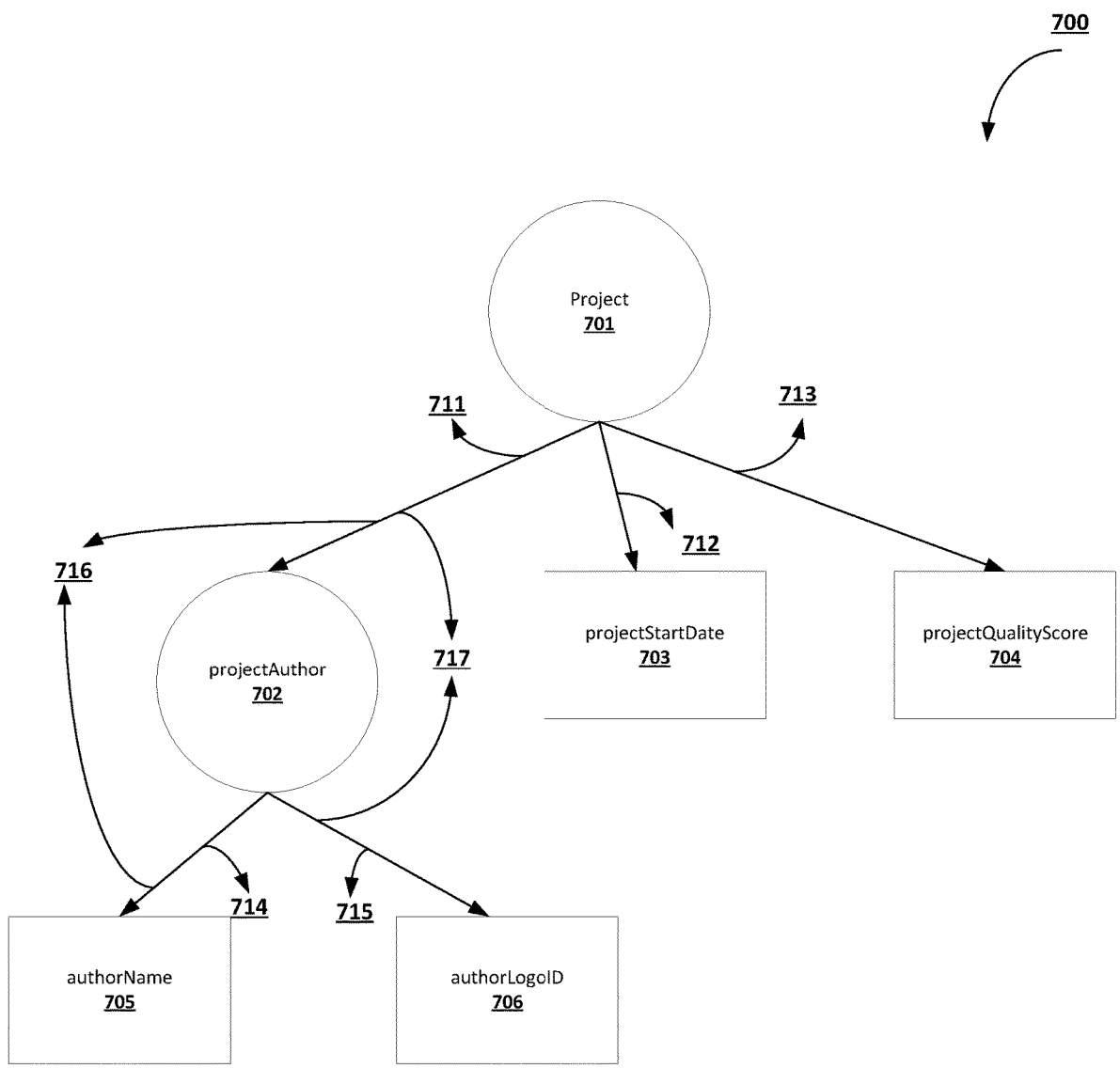

FIG. 7 provides an operational example of a query definition model, in accordance with at least some embodiments of the present invention.

Figure 8:
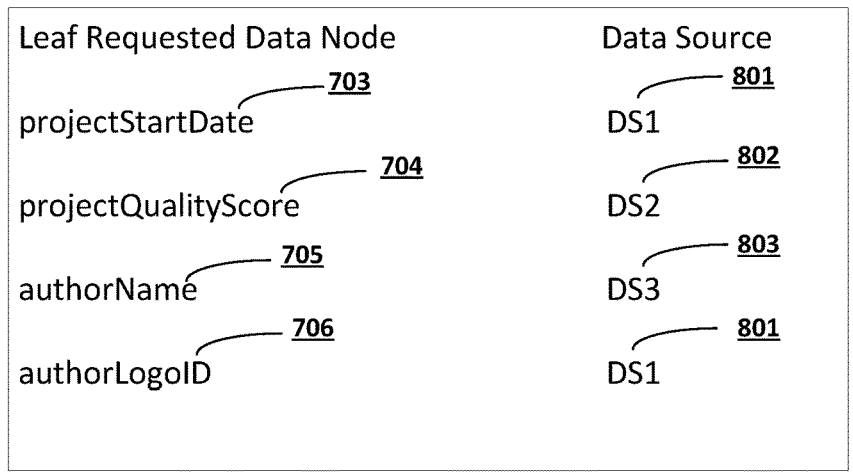

FIG. 8 provides an operational example of a data source association able, in accordance with at least some embodiments of the present invention.

Figure 9:
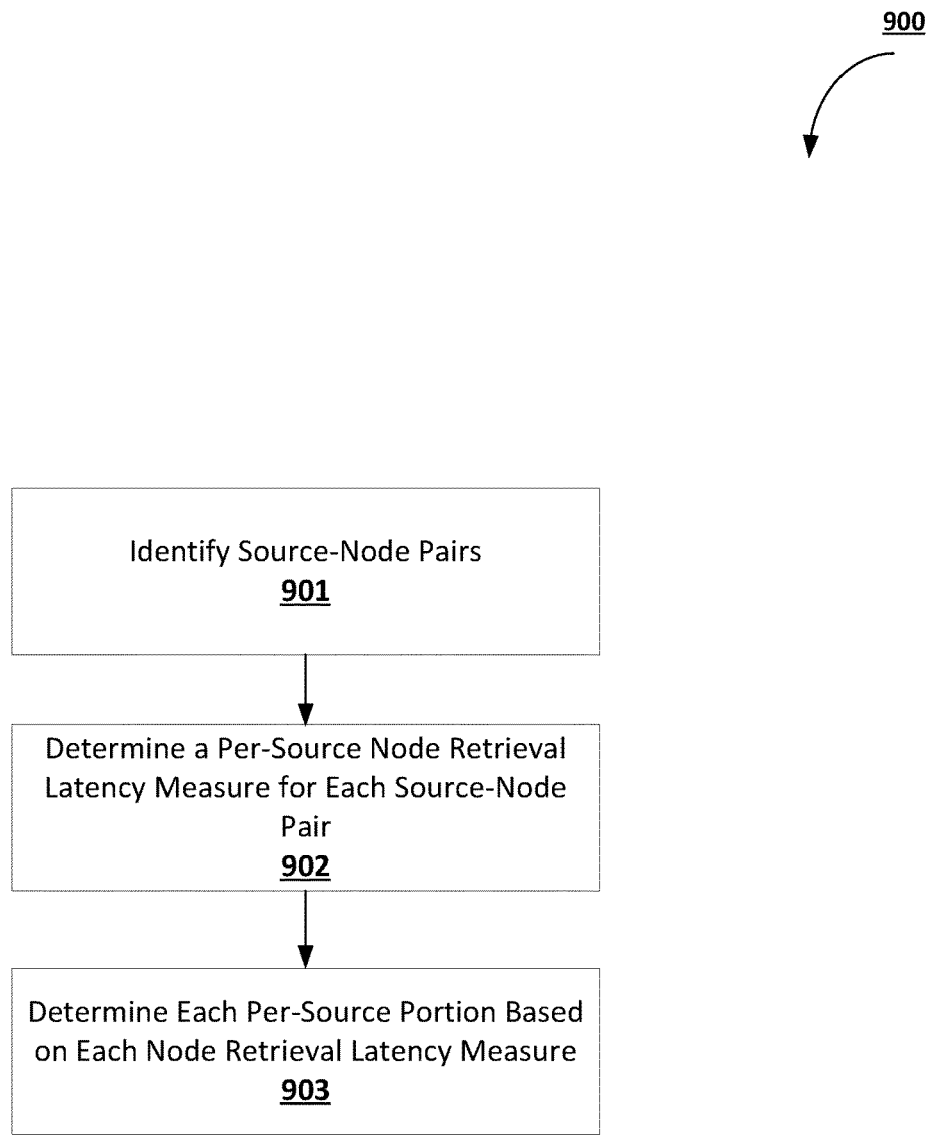

FIG. 9 is a flowchart diagram of an example process for determining a per-source portion of requested data nodes for each data source in a distributed database environment, in accordance with at least some embodiments of the present invention.

FIG. 10 provides an operational example of a node storage map, in accordance with at least some embodiments of the present invention.

FIG. 11 provides an operational example of a historical retrieval latency data table, in accordance with at least some embodiments of the present invention.

Figure 12:
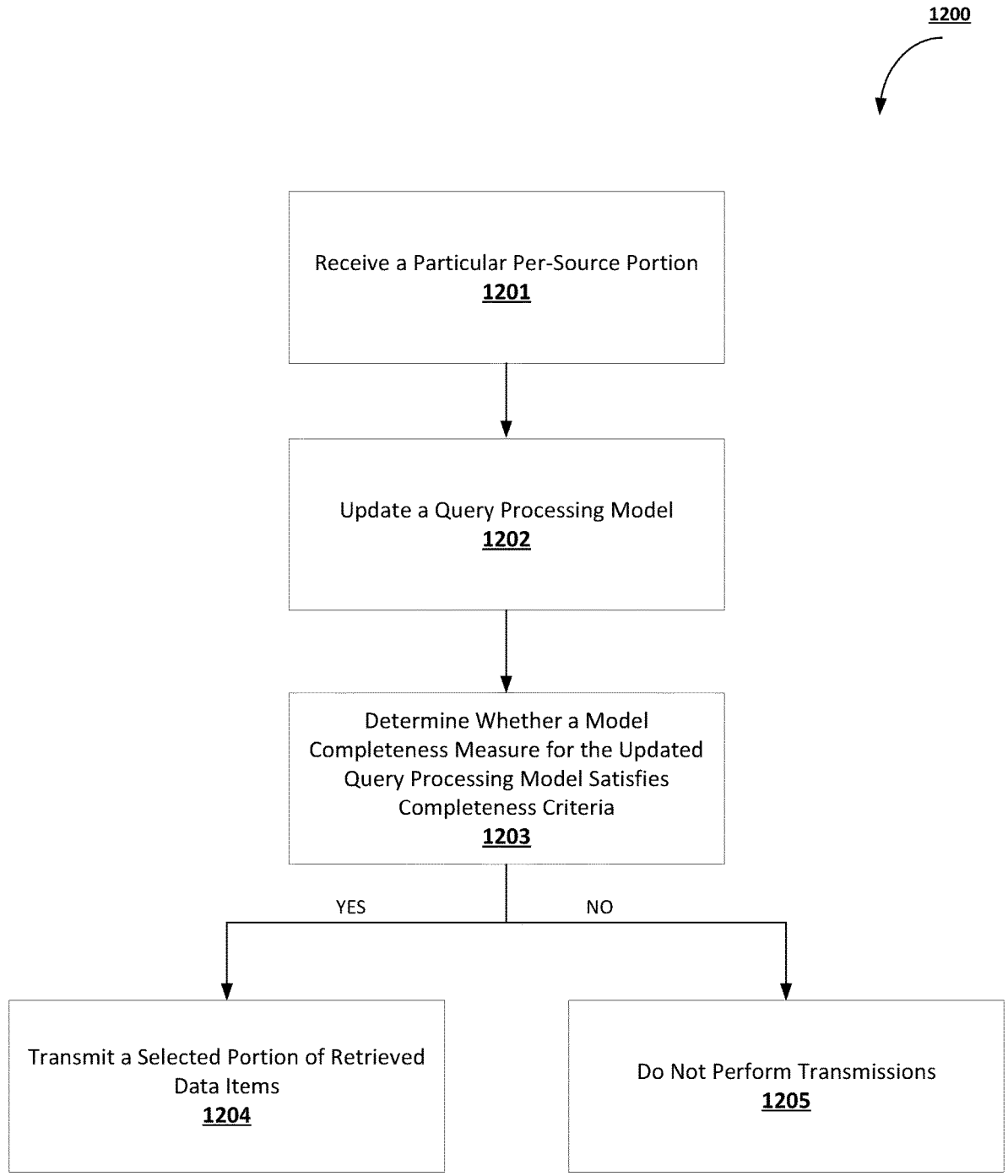

FIG. 12 is a flowchart diagram of an example process for incremental filtering of a per-source data portion, in accordance with at least some embodiments of the present invention.

Figure 13A:
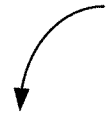
Figure 13B:
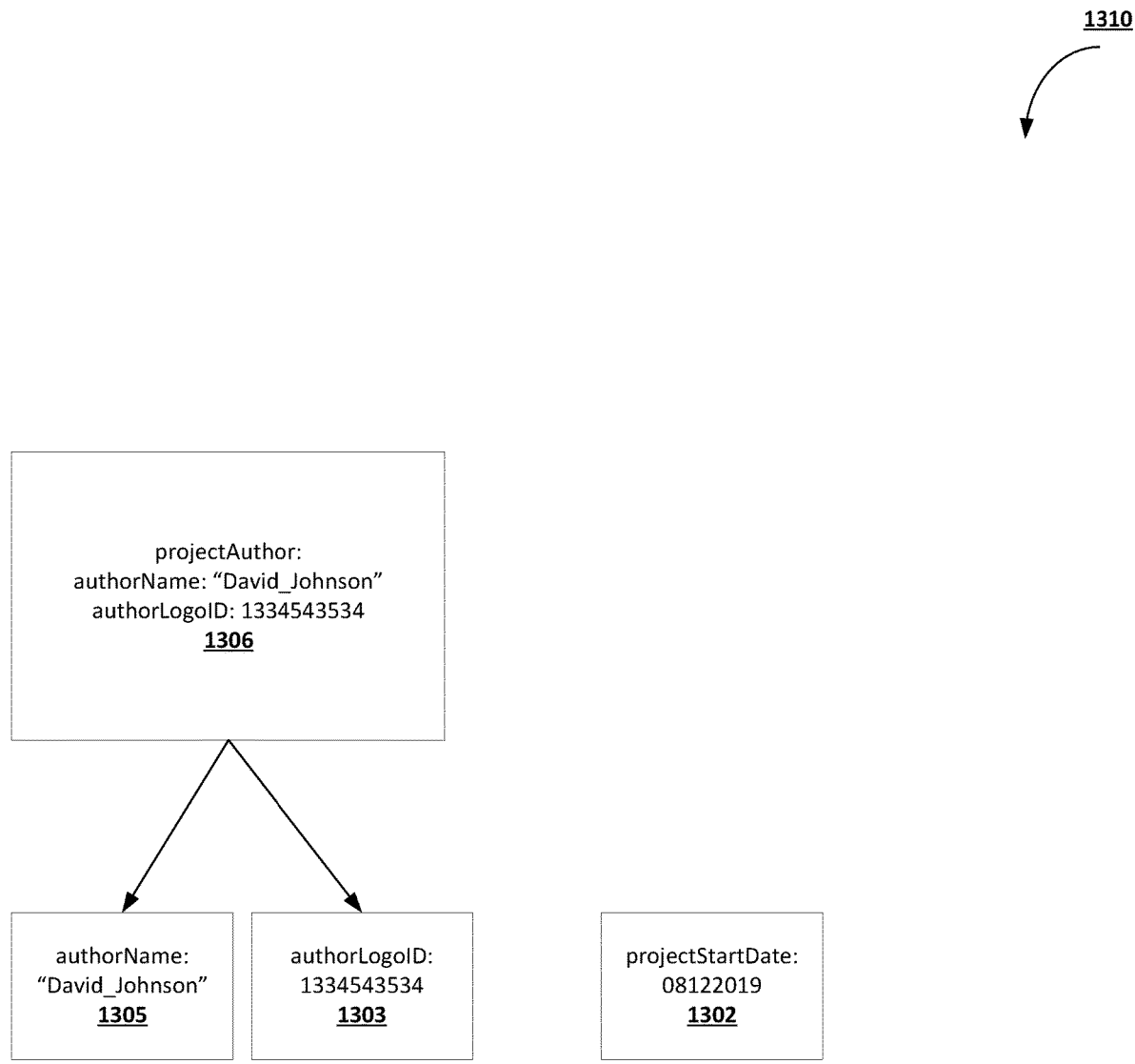

FIGS. 13A-13B provide an operational examples of three query processing model updates, in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical challenges related to improving efficiency of graph-query-based data retrieval systems in distributed database environments. In response to the rise of distributed database environments, many data retrieval systems have begun to enable graph-based query language capabilities, including by allowing users to transmit queries defined by the Graph Query Language (GraphQL). A key advantage of GraphQL is that it masks complexities associated with storage of data across multiple data sources from query-initiating users. For example, given a set of employee residence entries stored as a first data table in a first data source, a set of employee birthdate data stored as a second table in a second data source, a set of employee phone numbers stored in a third data source, and a set of employee image data stored in a fourth data source, utilizing GraphQL will allow a user to transmit a single query that requests images and phone numbers for employees born after 1990 who live in Sunnyvale, California, instead of three separate queries to four separate data sources which then need to be joined to produce the desired query output (as would be the case in a data retrieval system that utilizes Representational State Transfer (REST) query protocols).

Thus, enabling graph-based query language capabilities such as GraphQL capabilities has enabled many data retrieval data systems to improve user experience and increase overall utility of distributed data systems for data storage. However, graph-based query language capabilities may generate highly inefficient responses with unacceptable amounts of latency when retrieval of a portion of the requested data is abnormally slow. For example, in the example described above which relates to a query for images and phone numbers of employees born after 1990 who live in Sunnyvale, if transmission of the fourth data source containing employee image data is suffering from performance degradations due to network problems, generating the query output in response to the query may take a very long time. This may be despite the fact that the phone number data is of greater importance to the query-initiating user than the image data.

Accordingly, one innovative aspect of the techniques discussed in the present application relates to generating partial query outputs based on incrementally-received query outputs from various data sources. In some embodiments, upon obtaining each particular per-source portion of the requested data for a query from a particular data source, a data retrieval computing device updates a query processing model for the data retrieval query based on the particular per-source portion, where the query processing model includes any data items that have been retrieved up to a particular point. Then, the data retrieval computing device determines a model completeness measure for the updated query processing model based on a structural similarity measure between a query structure and a structure of the query processing model. Subsequently, the data retrieval computing device determines whether the model completeness measure satisfies one or more completeness threshold criteria. In some embodiments, in response to determining that the model completeness measure satisfies the one or more completeness threshold criteria, the data retrieval computing device generates a selected portion of the one or more retrieved data items as a partial query output for the data retrieval query. Accordingly, by enabling generation of partial query outputs, various embodiments of the present invention address technical challenges of existing graph-query-based data retrieval systems and make existing graph-query-based data retrieval systems more efficient. In doing so, various embodiments of the present invention make important technical contributions to ongoing developments in database design, especially with respect to distributed database systems that include various database systems.

Various embodiments of the present invention introduce innovative techniques for determining when incremental transmissions of received data should be performed. For example, by disclosing transmission intervals based on structural measures of retrieved data, e.g., based on whether the retrieved data include nodes having a threshold proximity to query graph root node, based on whether the retrieved data include a subtree of the query graph with a subtree root that has a requisite hierarchical degree, and/or based on whether the retrieved data correspond to a sufficiently large subtree within the query graph. In some embodiments, a query definition model defines, based on one or more hierarchical relationships between requested data nodes, a respective hierarchical degree for each requested data node, where each respective hierarchical degree for a requested data node is determined based on a hierarchical distance of the requested data node from a root data node. In some of those embodiments, the structural similarity measure between a query definition model and a query processing model is determined based on a lowest-degree retrieved data item in the query processing model. The noted structural similarity measure can then be used to determine whether to incrementally transmit data. For example, in some embodiments, a transmission is performed when the lowest-degree retrieved data item in the query processing model is below a hierarchical degree threshold.

In other embodiments, the query definition model further defines, based on the one or more hierarchical relationships, one or more hierarchical subtrees, where each hierarchical subtree of the one or more hierarchical subtrees is associated with a respective subtree root data node of the plurality of requested data nodes and any requested data nodes of the plurality requested data nodes that depend from the subtree root data object. In some of those embodiments, the structural similarity measure between the modeling structure and the processing structure is determined based on one or more captured subtree properties of one or more captured subtrees associated with the processing structure. The noted structural similarity measure can then be used to determine whether to incrementally transmit data. For example, in some embodiments, determining whether the structural similarity measure satisfies the one or more structural similarity criteria comprises determining whether the lowest-hierarchical-degree node in the query processing model is below a subtree node hierarchical degree threshold. As another example, in some embodiments, determining whether the structural similarity measure satisfies the one or more structural similarity criteria comprises determining whether a node association count of a largest subtree in the query processing model satisfies a node association count threshold.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client accesses the service by way of a network. Client devices may include, without limitation, smart phones, tablet computers, laptop computers, wearables, personal computers, enterprise computers, and the like.

The term "requested data node" refers to one or more data items specified by a data retrieval query which define how the data retrieval query may be executed by a query processing engine through retrievals from one or more data sources. The requested data nodes may include data nodes that define desired data objects (e.g., a social security number data object and a date of birth data object) as well as data nodes that define a semantic structure of a data retrieval query (e.g., an employee data node from which the data nodes for the social security number data object and the data nodes for the date of birth data object both depend).

The term "hierarchical relationship" refers to a semantic relationship specified by a data retrieval query between a first requested node and a second requested data node, where the second requested data node is deemed to recite particular properties of the first requested data node. For example, to request social security number and date of birth of an employee with an employee identification number 123456, the data retrieval query may define the following hierarchical relationships: (i) a hierarchical relationship between a requested node 'employee ID=123456' as a source node and a requested data node 'social security number' as a child node; and (ii) a hierarchical relationship between a requested node 'employee ID=123456' as a source node and a requested data node 'date of birth' as a child node.

The term "query definition model" refers to a data object that defines one or more requested data nodes associated with a particular data retrieval query. A query definition model further define one or more relationships between the one or more requested data nodes. For example, the query definition model for a data retrieval query may indicate that the data retrieval query requests titles of books rented by a first user. In this example, the requested data nodes associated with the query definition model may correspond to the first user, the books, and the titles of books, while the relationships between the requested data nodes may indicate a "has rented" relationship between the first user node and the books node as well as a "has title" relationship between the books node and the title node. The query definition model for a data retrieval query may have a graph-based structure.

The term "retrieved data item" refers to any collection of one or more data objects associated with a data retrieval query that have been successfully retrieved from a data source before occurrence of a particular point in time. In some embodiments, when retrieval of all data objects associated with a data retrieval query requires retrieving data from two or more data sources, the contents of the retrieved data items at each point in time may be different. For example, after a first point in time subsequent to retrieval of data from a first data source but precedent to retrieval of data from a second data source, the data objects associated with the first data source may be retrieved data items while the data objects associated with the second data source may not be retrieved data items.

The term "query processing model" refers to a data object that defines one or more retrieved data items associated with a data retrieval query. In instances where the retrieval of data in response to a data retrieval query is incremental, the contents of the a query processing model for the data retrieval query may be different at different times. For example, a query processing model may have different contents upon receipt of data from a first data source, a second data source, etc. In some embodiments, the retrieved data items in a query processing model for a data retrieval query correspond to at least some of the requested data nodes associated with the query definition model for the data retrieval query. In some embodiments, the retrieved data items in a query processing model for a data retrieval query correspond to at least some of the leaf-level requested data nodes associated with the query definition model for the data retrieval query. The query processing model for a data retrieval query may have a graph-based structure.

The term "model completeness measure" refers to a data object generated by a query processing engine that determines the structural complexity of a query processing model relative to the structural complexity of a query definition model. In some embodiments, the model completeness may determine how much of a data associated with a data retrieval query has been retrieved as a result of one or more successfully-completed executed data retrievals from particular data sources.

The term "per-source portion" refers to a data object generated by a query processing engine in order to use in retrieving data in response to a data retrieval query, where the per-source portion defines a portion of the intended results of the data retrieval query that is configured to be retrieved from a particular data source by the query processing engine. For example, given a data retrieval query that requests data items D1 and D2 from a data source DS1 and data items D3 and D4 from a data source DS2, a query processing engine may generate the following per-source portions: DS1:{D1, D2} and DS2:{DS3, DS4}.

The term "partial query output" refers to a collection of one or more data objects that may include a portion of expected result for a particular query and that are ready for further processing by a query processing engine in order to generate a desired output by the query processing engine (e.g., for transmission to a query-imitating device and/or for rendering on a user interface platform). For example, a partial query output may be generated based on receipt of a per-data-source portion of the expected result from a particular data source. As another example, a partial query output may be generated based on transmission of a previously-non-transmitted portion of the expected result subsequent to a previous transmission of a previous portion of the expected result.

The term "per-source retrieval latency measure" for a requested data node and a data source is a collection of one or more data items that describes an expected operational performance metric for retrieval of the requested data node from the data source. For example, a per-source retrieval latency measure for a requested data node and a data source may indicate an expected speed for retrieval of the requested data node from the data source. As another example, a per-source retrieval latency measure for a requested data node and a data source may indicate an expected required network bandwidth for retrieval of the requested data node from the data source. As a further example, a per-source retrieval latency measure for a requested data node and a data source may indicate an expected required storage bandwidth for retrieval of the requested data node from the data source.

The term "historic data retrieval latency data" for a data source is a collection of one or more data items that describes operational performance metrics for at least one past attempt to retrieve particular data nodes from the data source. For example, the historical data retrieval latency data for a particular data source may indicate, for each data node of a plurality of data nodes stored on the data source, an average retrieval latency of past attempts to retrieve the data node from the particular data source. As another example, the historical data retrieval latency data for a particular data source may indicate, for each data node of a plurality of data nodes stored on the data source, an average retrieval failure rate of past attempts to retrieve the data node from the particular data source. As a further example, the historical data retrieval latency data for a particular data source may indicate, for each data node of a plurality of data nodes stored on the data source, an average retrieval network resource consumption rate of past attempts to retrieve the data node from the particular data source.

The term "query processing engine" includes any software application configured to receive a data retrieval query and process the data retrieval query to generate one or more desired query outputs. For example, a query processing engine may be configured to generate query desired outputs by transmitting such outputs to query-initiating devices. As another example, a query processing engine may be configured to generate query desired outputs by displaying user interface elements associated with a data retrieval query on a display device. As a further example, a query processing engine may be an incremental rendering engine operating on a query-initiating device.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
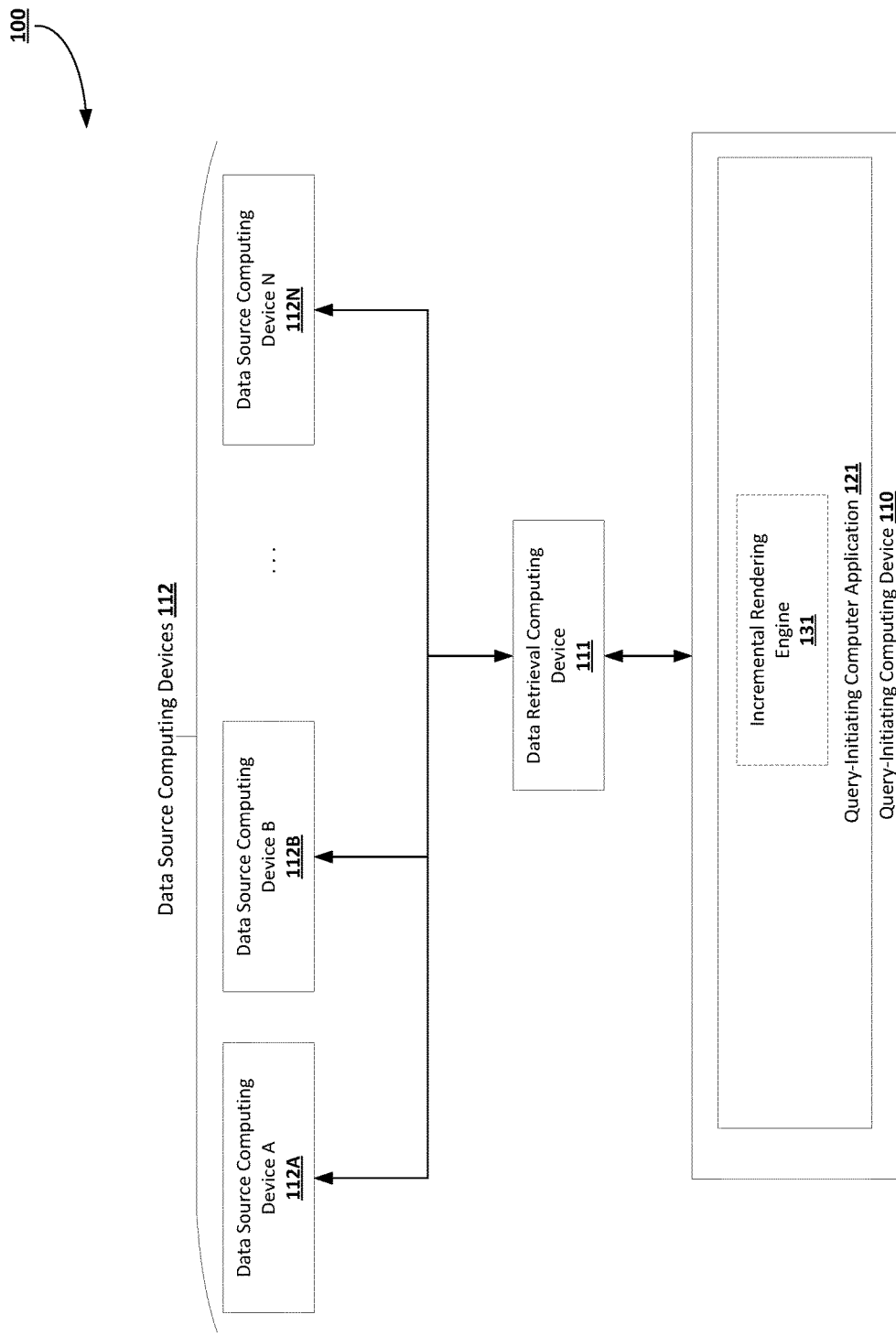
FIG. 1 is a block diagram of an example architecture within which at least some embodiments of the present invention may operate.

FIG. 1 illustrates an example system architecture 100 within which embodiments of the present invention may operate. The architecture 100 includes a data retrieval computing device 111 configured to interact with a query-initiating computing device 110 and one or more data source computing devices 112, such as the data source computing device A 112A, the data source computing device B 112B, and the data source computing device N 112N. The data retrieval computing device 111 may enable the query-initiating computing device 110 to retrieve data from the data source computing devices 112 using one or more data retrieval queries, e.g., using one or more cross-data-source data retrieval queries.

The data retrieval computing device 111 may communicate with the query-initiating computing device 110 and the data source computing devices 112 over a network (not shown). The network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMax network. Further, the network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

Each computing device associated with the architecture 100 may have a storage subsystem (not shown). The storage subsystem may include one or more storage units, such as multiple distributed storage units that are connected through a computer network. Each storage unit in the storage subsystem may store at least one of one or more data assets and/or one or more data about the computed properties of one or more data assets. Moreover, each storage unit in the storage subsystem may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Each the data source computing device 112 may be a computing device configured to retrieve data in responses to data retrieval queries of various kinds. For example, a data source computing device 112 may be configured to retrieve data in response to GraphQL queries. As another example, a data source computing device 112 may be configured to retrieve data in response to REST queries. As yet another example, a data source computing device 112 may be a legacy data retrieval computing device. As a further example, a data source computing device 112 may be a computing device configured to provide data as part of one or more predefined micro-services.

The query-initiating computing device 110 may execute one or more software applications, such as a query-initiating software application 121. The query-initiating software application 121 may be any software application that is configured to retrieve data from at least some of the data source computing devices 112 using the data retrieval computing device 111. The query-initiating software application 121 may include an incremental rendering engine 131 configured to generate user interface elements based on data received via incrementally-transmitted query outputs transmitted by the data retrieval computing device 111.

Exemplary Data Retrieval Computing Device

Figure 2:
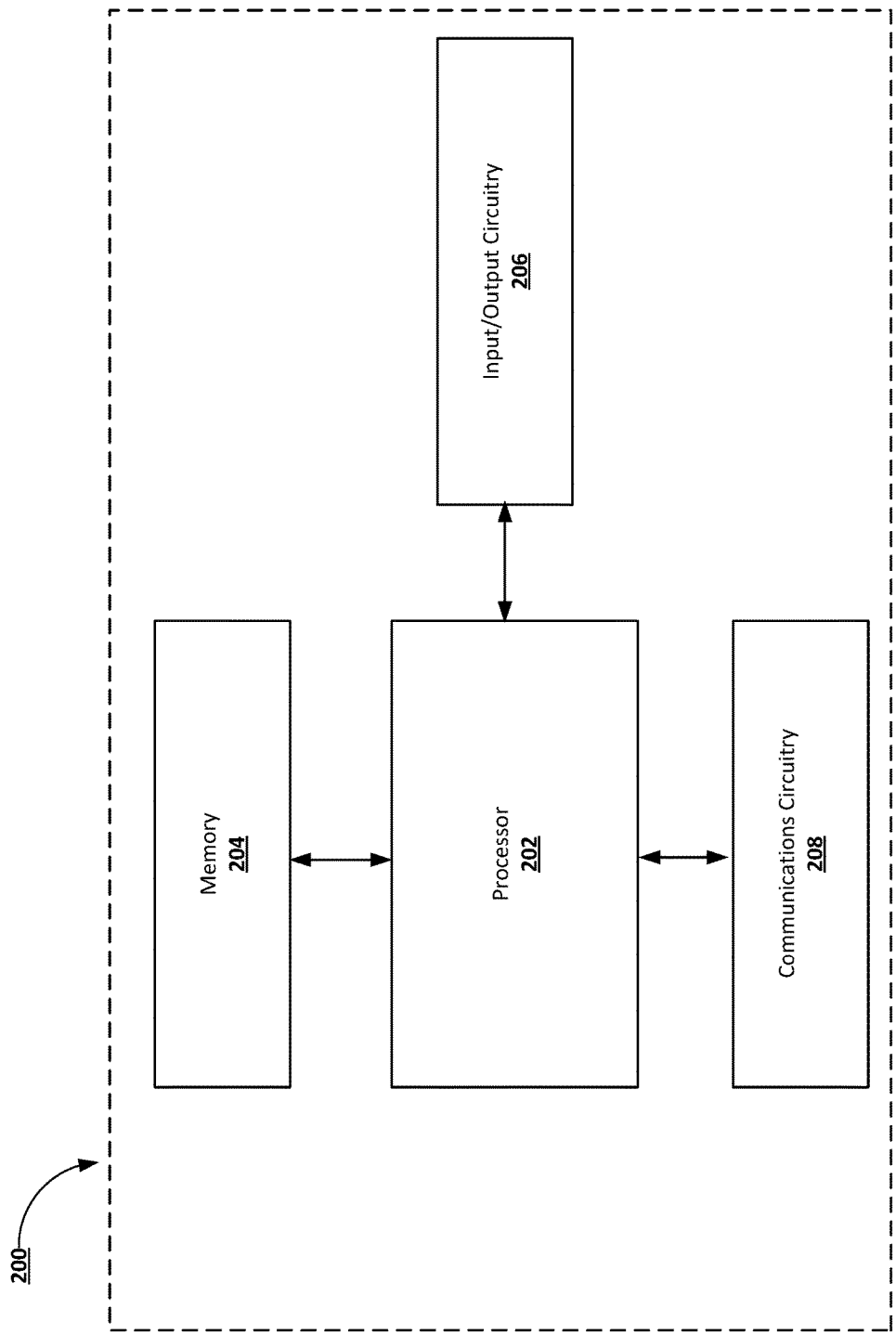
FIG. 2 is a block diagram of an example data retrieval computing device, in accordance with at least some embodiments of the present invention.

The data retrieval computing device 111 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/ or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Query-Initiating Computing Device

Figure 3:
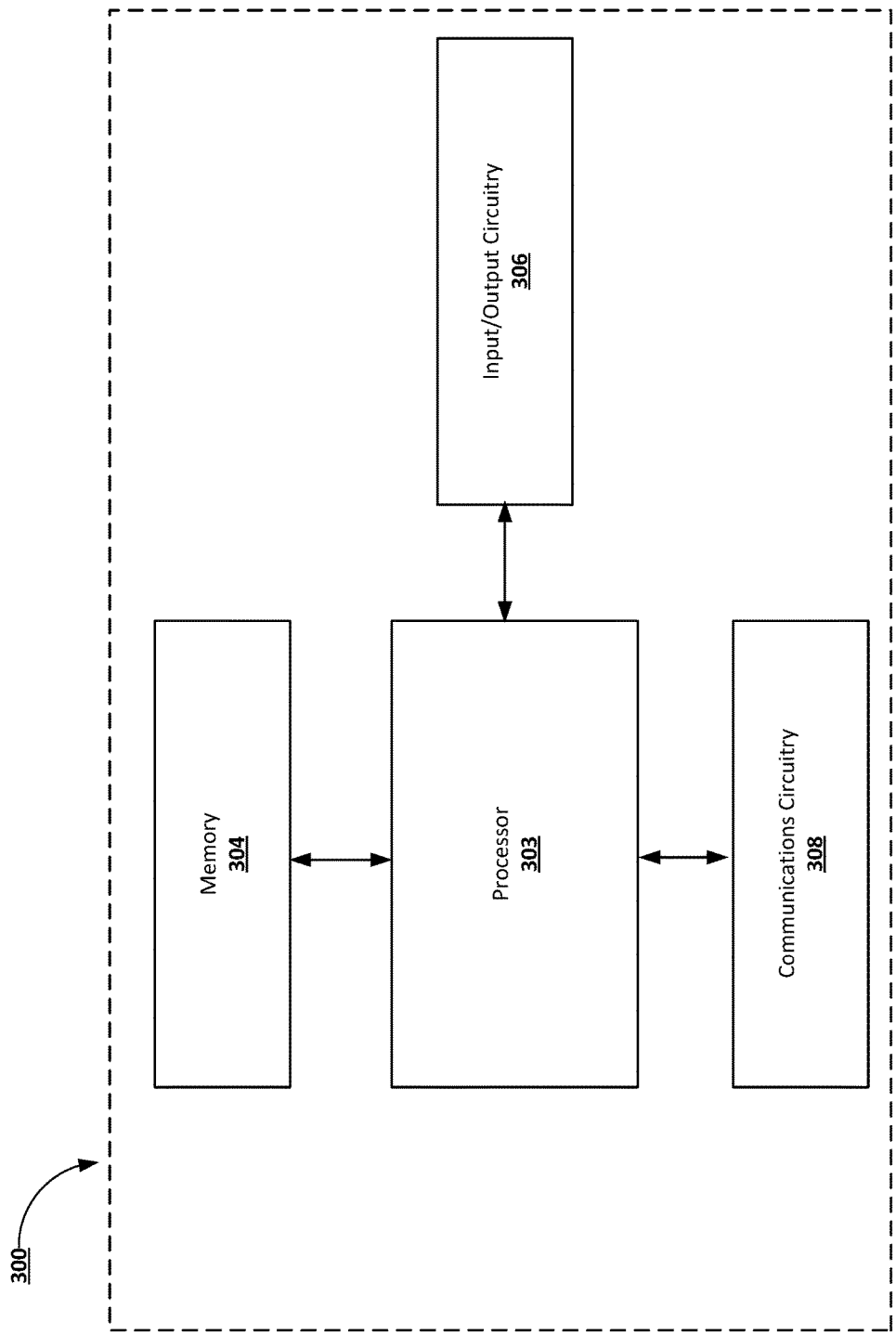
FIG. 3 is a block diagram of an example query-initiating computing device, in accordance with at least some embodiments of the present invention.

Referring now to FIG. 3, the query-initiating computing device 120 may be embodied by one or more computing systems, such as apparatus 300 shown in FIG. 3. The apparatus 300 may include processor 302, memory 304, input/output circuitry 306, and communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Data Source Computing Device

Figure 4:
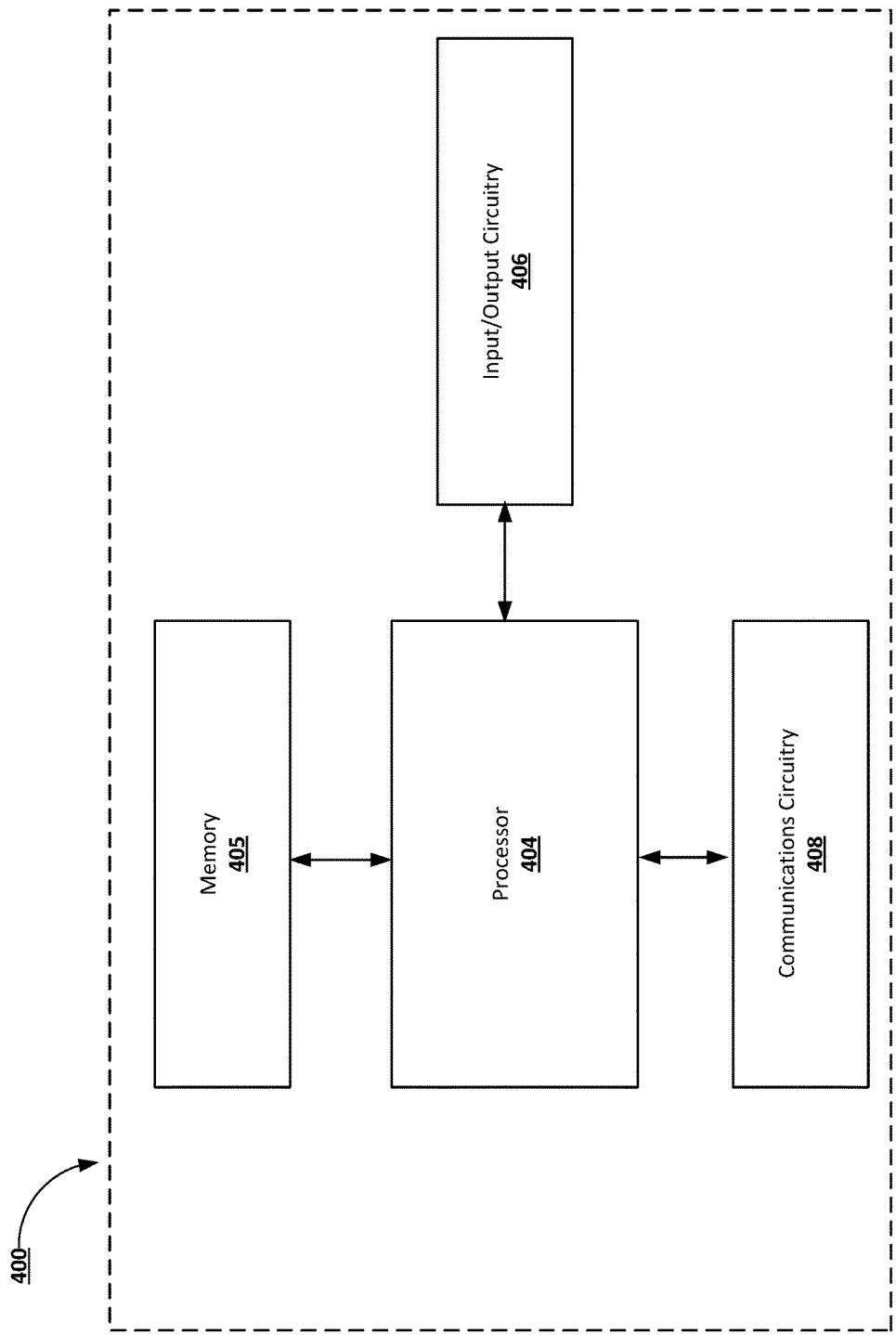
FIG. 4 is a block diagram of an example data source computing device, in accordance with at least some embodiments of the present invention.

A data source computing device 112 may be embodied by one or more computing systems, such as apparatus 400 shown in FIG. 4. The apparatus 400 may include processor 402, memory 404, input/output circuitry 406, and communications circuitry 408. The apparatus 400 may be configured to execute the operations described herein. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like. In some embodiments, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows and Operations

In general, embodiments of the present invention provide methods, apparatuses, systems, computing devices, and/or the like that are configured to enable database retrieval in distributed data environments. For example, certain embodiments of the present invention provide methods, apparatuses, systems, computing devices, and/or the like that are configured to enable database retrieval in distributed database systems using at least one of query definition models, incrementally-updated query processing models, model completeness measures for query processing models, per-source node retrieval latency measures, etc.

For example, one innovative aspect of the techniques discussed in the present application relates to generating partial query outputs based on incrementally-received query outputs from various data sources. In some embodiments, upon obtaining each particular per-source portion of the requested data for a query from a particular data source, a data retrieval computing device updates a query processing model for the data retrieval query based on the particular per-source portion, where the query processing model includes any data items that have been retrieved up to a particular point. Then, the data retrieval computing device determines a model completeness measure for the updated query processing model based on a structural similarity measure between a query structure and a structure of the query processing model. Subsequently, the data retrieval computing device determines whether the model completeness measure satisfies one or more completeness threshold criteria. In some embodiments, in response to determining that the model completeness measure satisfies the one or more completeness threshold criteria, the data retrieval computing device generates a selected portion of the one or more retrieved data items as a partial query output for the data retrieval query. By enabling generation of partial query outputs, various embodiments of the present invention address technical challenges of existing graph-query-based data retrieval systems and make existing graph-query-based data retrieval systems more efficient. In doing so, various embodiments of the present invention make important technical contributions to ongoing developments in database design, especially with respect to distributed database systems that include various database systems.

Figure 5:
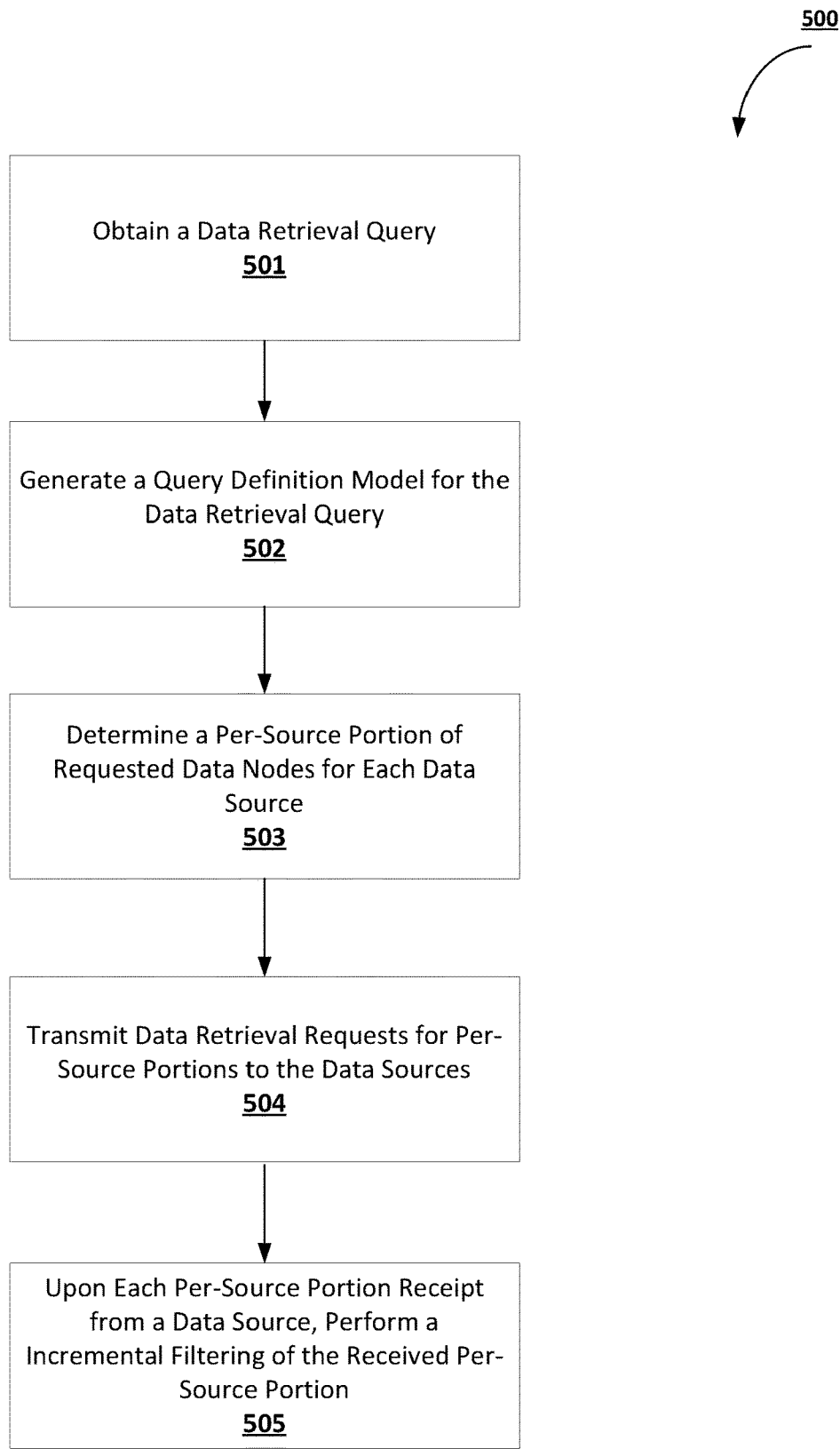
FIG. 5 is a flowchart diagram of an example process for incremental transmission of query outputs in response to data retrieval queries and in a distributed database environment, in accordance with at least some embodiments of the present invention.

FIG. 5 is a flowchart diagram of an example process 500 for processing a data retrieval query using a plurality of data sources 112 by transmitting partial query outputs in response the data retrieval query. Via the various operations of process 500, the data retrieval computing device 111 can perform incremental delivery of partial query outputs in order to improve efficiency and reliability of query processing in data retrieval environments.

Process 500 begins at operation 501 when the data retrieval computing device 111 obtains the data retrieval query. The data retrieval query may define a plurality of requested data nodes. In some embodiments, the data retrieval query may further define one or more hierarchical relationships between the plurality of requested data nodes, where each hierarchical relationship of the one or more hierarchical relationships may be a conceptual dependency relationship between a parent data node of the plurality of requested data nodes and a child data node of the plurality of requested data nodes. In some embodiments, the data retrieval query may be a graph-based data retrieval query, such as Graph Query Language (GraphQL) query.

FIG. 6 provides an operational example of a data retrieval query 600. The data retrieval query 600 includes, on its first line, a query meta-type indicator 601 that indicates that the data retrieval query 600 is indeed a query. The data retrieval query 600 further includes, on its second line, a root node indicator 602 that indicates that the data retrieval query 600 seeks data relating to a stored software development project with the project identifier ABC132654. The data retrieval query 600 further includes, in the query region 611, indications of five requested data nodes (i.e., a projectAuthor requested data node, an authorName requested data node, an authorLogoID requested data node, a projectStartDate requested data node, and a projectQualityScore requested data node), each of which hierarchically depends from the root Project node 601 identified on the second line of the data retrieval query 600. Region 612 of the data retrieval query 600 further indicates that the requested data nodes authorName and authorLogoID each hierarchically depends from the projectAuthor data node 602 identified on the second line of the data retrieval query 600.

At operation 502, the data retrieval computing device 111 generates a query definition model for the data retrieval query model. The query definition model may indicate the one or more hierarchical relationships between the plurality of requested data nodes as defined by the data retrieval query. For example, the query definition model may be a graph-based query definition model.

An example graph-based query definition model 700 corresponding to the data retrieval query 600 of FIG. 6 is presented in FIG. 7. As depicted in FIG. 7, the graph-based query definition model 700 indicates the following seven hierarchical relationships 711-717 between the six requested data nodes 701-706: (i) the direct hierarchical relationship 711 between the requested data node Project 701 and the requested data node projectAuthor 702, (ii) the direct hierarchical relationship 712 between the requested data node Project 701 and the requested data node projectStartDate 703, (iii) the direct hierarchical relationship 713 between the requested data node Project 701 and the requested data node projectQualityScore 704, (iv) the direct hierarchical relationship 714 between the requested data node projectAuthor 702 and the requested data node authorName 705, (v) the direct hierarchical relationship 715 between the requested data node projectAuthor 702 and the requested data node authorLogoID 706, (vi) the indirect hierarchical relationship 716 between the requested data node Project 701 and the requested data node authorName 705, and (vii) the indirect hierarchical relationship 717 between the requested data node Project 701 and the requested data node authorLogoID 706.

Returning to FIG. 3, at operation 503, the data retrieval computing device 111 determines, for each data source of the plurality of data sources 112, a per-source portion of the plurality of requested data nodes. In some embodiments, the data retrieval computing device 111 identifies one or more leaf requested data nodes of the plurality of requested data nodes based on the query definition model, wherein a leaf requested data node is a requested data node that does not have any hierarchical relationships in which it is a parent data node (i.e., does not have any data node that hierarchically depend from it). In some embodiments, after identifying the one or more requested data nodes, the data retrieval computing device 111 selects, for each leaf requested data node of the one or more leaf requested data nodes, a data source association with a data source that stores the leaf requested data node. The data retrieval computing device 111 may then determine each per-source portion for a data source of the plurality of data sources based on each data source association for a leaf requested data node of the one or more requested data nodes.

For example, the data retrieval computing device 111 may process the query definition model 700 of FIG. 7 to identify the leaf requested data nodes 703-706. As depicted in this example, the leaf requested data nodes 703-706 may define the concrete data that will be retrieved from the plurality of data sources 112, while the non-leaf requested data nodes 701-702 may define conceptual hierarchies for the defined concrete data. In some embodiments, after identifying the leaf requested data nodes 703-706, the data retrieval computing device 111 proceeds to determine a data source association for each of the leaf requested data nodes. For example, as depicted in the data source association table 800 of FIG. 8, the leaf requested data node 703 and the leaf requested data node 706 are associated with the data source DS1 801, while the leaf requested data node 704 is associated with the data source DS2 802 and the leaf requested data node 705 is associated with the data source DS3 803. In some embodiments, in accordance with the data source association table 800 of FIG. 8, the data retrieval computing device 111 may determine that the per-source portion of DS1 801 includes the requested data nodes 703 and 706, that the per-source portion of DS2 802 includes the requested data node 704, and that the per-source portion of DS3 803 includes the requested data node 705.

In some embodiments, determining the per-source portions of the plurality of data node may be performed in accordance with the operations depicted in FIG. 9, which is a flowchart diagram of an example process 900 for determining per-source portions based on historic data retrieval latency data. The process 900 begins at operation 901 when the data retrieval computing device 111 identifies one or more source-node pairs, where each source-node pair of the one or more source-nodes is associated with a data source of the plurality of data nodes and a requested data node of the plurality of requested data nodes that is stored on the data source. In some embodiments, to determine the one or more source-node pairs, the data retrieval computing device 111 utilizes a node storage map that indicates, for each requested data node of the plurality of requested data nodes, one or more per-node data sources on which the requested data node is stored.

An operational example of a node storage map 1000 for the leaf requested data nodes 703-706 of the query definition model 700 of FIG. 7 is depicted in FIG. 10. As depicted in the node storage map 1000 of FIG. 10, leaf requested data node 703 is stored on data sources DS1 801 and data source DS2 802, leaf requested data node 704 is stored on data sources DS2 802 and data source DS3 803, leaf requested data node 705 is stored on data source DS3 803, and leaf requested data node 706 is stored on data source DS1 801, data source DS2 802, and data source DS3 803.

Returning to FIG. 9, at operation 902, the data retrieval computing device 111 determines, for each source-node pair of the one or more source-node pairs, a per-source node retrieval latency measure based on historic data retrieval latency data for the data source that is associated with the source-node pair in relation to the requested data node that is associated with the source-node pair. In some embodiments, the particular per-source node retrieval latency measure for a particular source-node pair that is associated with a particular requested data node and a particular data source is an estimated measure of latency of retrieval of the particular requested data node from the particular data source. To determine the per-source node retrieval latency measures, the data retrieval computing device 111 may utilize historic retrieval latency data for the plurality of data sources. The historical retrieval latency data may in turn be determined based on operational data for past data retrieval attempts from the plurality of data sources, such as past test data retrieval attempts by the data retrieval computing device 111 configured to generate the historical retrieval latency data for the plurality of data sources.

FIG. 11 provides an operational example of a historical retrieval latency data table 1100 for data source DS1 801, data source DS2 802, and data source DS3 803. Each entry value of the historical retrieval latency data table 1100 is associated with a corresponding data source and a corresponding requested data node. In the historical retrieval latency data table 1100 of FIG. 11: (i) when an entry value of the historical retrieval latency data table 1100 is an infinity (co) value (e.g., the entry value 1101 associated with the leaf requested data node 705 and the data source DS1 801), the entry value indicates that the corresponding leaf requested node is not stored on the corresponding data source; (ii) when an entry value of the historical retrieval latency data table 1100 is a non-infinity value (e.g., entry value 1102 associated with leaf requested data node 706 and data source DS2 802), the entry value indicates the per-source node retrieval latency measure for the requested data node and the data source, e.g., the per-source node retrieval latency measure determined based on a statistical distribution (e.g., mean, median, mode, etc.) of past retrieval speed times for retrieval of the requested data node from the data source; (iii) when an entry value of the historical retrieval latency data table 1100 that is associated with a corresponding requested data node is underlined (e.g., entry value 1103 associated with leaf requested data node 706 and data source DS1 801), the entry value indicates that the entry value is the lowest per-source node retrieval latency measure associated with the corresponding requested data node; and (iv) when an entry value of the historical retrieval latency data table 1100 that is associated with a corresponding requested data node is not underlined (e.g., entry value 1104 associated with leaf requested data node 706 and data source DS3 803), the entry value indicates that the entry value is not lowest per-source node retrieval latency measure associated with the corresponding requested data node.

Returning to FIG. 9, at operation 903, the data retrieval computing device 111 determines each per-source portion based on each per-source node retrieval latency measure for a source-node pair of the one or more source-node pairs. In some embodiments, the data retrieval computing device 111 selects a leaf requested data node as part of the per-source portion for a data source when the per-source node retrieval latency measure associated with the leaf requested data node and the data source is the lowest per-source node retrieval latency measure associated with the leaf request data node, i.e., when estimated measure of retrieval latency of the particular requested data node from the particular data source is lower than the estimated measure of latency of retrieval of the particular requested data node from any other data source on which the particular requested data node is stored. In some embodiments, the data retrieval computing device 111 selects the per-source portions based at least in part on one or more load balancing models for various data source computing devices 112, e.g., in accordance with one or more trained load balancing models for the data source computing devices 112 configured to optimize a predicted performance metric across all of the data source computing devices 112.

Thus, in some embodiments, the entry values in the historical retrieval latency data table 1100 of FIG. 11 that correspond to lowest per-source node retrieval latency measures for the corresponding leaf requested data nodes (i.e., the underlined entry values of the historical retrieval latency data table 1100 of FIG. 11) can be used to generate the data source association table 800 of FIG. 8. The data source association table 800 can in turn be used to generate the per-source portions for the data sources. For example, based on data source association table 800, the per-source portion for the data source DS1 801 may include the leaf requested data node 703 and the leaf requested data node 706, the per-source portion for the data source DS2 802 may include the leaf requested data node 704, and the per-source portion for the data source DS3 803 may include the leaf requested data node 705.

Returning to FIG. 5, the process 500 continues at operation 504 when the data retrieval computing device 111 transmits a respective data retrieval request for the respective per-source portion for each data source of the plurality of data sources to the corresponding data source. At operation 505, the data retrieval computing device 111 performs an incremental filtering of each received per-source portion for a data source upon receiving of the per-source portion from the data source. In some embodiments, upon receiving a particular per-source portion from a data source, to perform the incremental filtering of the particular received per-source portion, the data retrieval computing device 111 determines whether combination of all received per-source portions up to the particular point of receiving the particular received per-source portion is sufficiently complete in relation to the query definition model generated in operation 502. In some of those embodiments, in response to determining that the combination of all received per-source portions is sufficiently complete in relation to the query definition model generated in operation 502, the data retrieval computing device 111 transmits at least a portion (e.g., a previously non-transmitted portion) of the combination to the query-initiating computing device 110. However, in response to determining that the combination of all received per-source portions is not sufficiently complete in relation to the query definition model generated in operation 502, the data retrieval computing device 111 does not perform any transmissions to the query-initiating computing device 110.

In some embodiments, performing the incremental filtering of a particular per-source portion received from a particular data source may be performed in accordance with the operations of the process 1200 depicted in FIG. 12. As depicted in FIG. 12, the process 1200 begins at operation 1201 when the data retrieval computing device 111 receives the particular per-source portion from the particular data source. At operation 1202, the data retrieval computing device 111 updates a query processing model for the data retrieval query based on the particular per-source portion. In some embodiments, the query processing model comprises one or more retrieved data items, where at least some of the one or more retrieved data items may correspond to at least some of the leaf requested nodes of the query definition model. For example, assuming that the data retrieval computing device 111 receives the per-source portion of the data source DS3 803 first, the per-source portion of the data source DS1 801 second, and the per-source portion for the data source DS3 803 third, the data retrieval computing device 111 may update a query processing model in accordance with the query processing model state 1300 of FIG. 13A after receiving the per-source portion of the data source DS3 803, in accordance with the query processing model state 1310 of FIG. 13B after receiving the per-source portion of the data source DS1 801, and in accordance with the query processing model state 1320 of FIG. 13C after receiving the per-source portion of the data source DS3 803.

As depicted in FIG. 13A, the query processing model state 1300 includes a retrieved data item 1301 that corresponds to the requested data node 705. As depicted in FIG. 13B, the query processing model state 1310 includes, in addition to the retrieved data item 1301 that corresponds to the requested data node 705, the retrieved data item 1302 that corresponds to the requested data node 703 and the retrieved data item 1303 that corresponds to the requested data node 706. Moreover, because the query processing model state 1320 now includes each leaf data node 705-706 associated with the sub-graph with the root subtree data node 702 as defined by the query definition model 700 of FIG. 7, the query processing model state 1320 may further append a retrieved data item 1306 corresponding to the requested data node 702 to the query processing model state 1310.

Figure 13C:
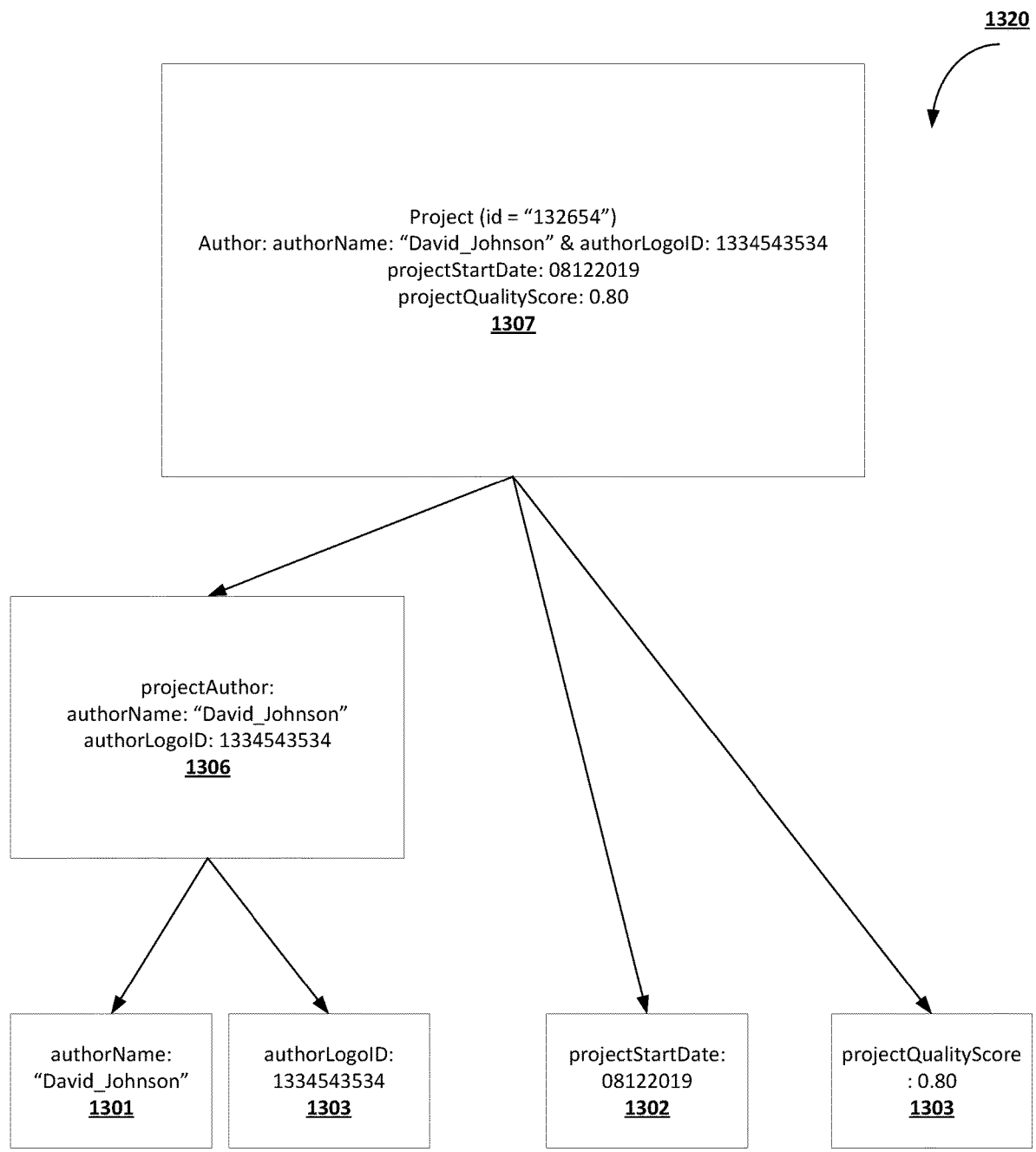

As depicted in FIG. 13C, the query processing model state 1320 includes, in addition to the retrieved data item 1301 that corresponds to the requested data node 705, the retrieved data item 1302 that corresponds to the requested data node 703, and the retrieved data item 1303 that corresponds to the requested data node 706, the retrieved data item 1304 that corresponds to the requested data node 704. Moreover, because the query processing model state 1320 now includes each leaf data node 703-706 associated with the sub-graph with the root subtree data node 701 as defined by the query definition model 700 of FIG. 7, the query processing model state 1320 may further append a retrieved data item 1307 corresponding to the requested data node 701 to the query processing model state 1320.

Returning to FIG. 12, at operation 1203, the data retrieval computing device 111 determines whether a model completeness measure for the updated query processing model satisfies one or more completeness threshold criteria. In some embodiments, after updating the query processing model following receiving a particular per-source portion of the requested data nodes from a data source, the data retrieval computing device 111 determines a model completeness measure for the updated query processing model, wherein the model completeness measure for the updated query processing model indicates a structural similarity measure between a modeling structure of the query definition model and a processing structure of the query processing model. Subsequently, the data retrieval computing device 111 determines whether the model completeness measure satisfies the one or more completeness threshold criteria.

The model completeness measure for a query model may be determined based on any measure of structural similarity of the query definition model and the query processing model. For example, the model completeness measure for a query model may be determined based on the lowest-degree node of the query processing model. In some embodiments, the query definition model defines, based on the hierarchical relationships between the requested data nodes, a respective hierarchical degree for each requested data node, where each respective hierarchical degree for a requested data node is determined based on a hierarchical distance of the requested data node from a root requested data (e.g., the Project node 701 of the query definition model 700 of FIG. 7). In some of those embodiments, the structural similarity measure between the modeling structure of the query definition model and the processing structure of the query definition model is determined based on the hierarchical degree of a retrieved data item of the plurality of retrieved data items that has a lowest hierarchical degree among the plurality of retrieved data items. In some of those embodiments, the structural similarity measure between the modeling structure of the query definition model and the processing structure of the query definition model is determined based on the lowest hierarchical-degree node whose corresponding data are retrieved and included the query processing model.

For example, the structural similarity measure between the modeling structure of the query definition model 700 and the processing structure of the query processing model 1300 is two, the structural similarity measure between the modeling structure of the query definition model 700 and the processing structure of the query processing model 1310 is one, and the structural similarity measure between the modeling structure of the query definition model 700 and the processing structure of the query processing model 1320 is zero. In some embodiments, the structural similarity measure between a modeling structure of a query definition model and a processing structure of a query processing model satisfies the one or more completeness threshold criteria when the lowest hierarchical degree associated with the query definition model is below a hierarchical degree threshold. For example, given a hierarchical degree threshold of two, the query processing model 1300 does not satisfy the one or more completeness threshold criteria, while the query processing model 1310 and the query processing model 1320 satisfy the one or more completeness threshold criteria.

In some embodiments, the query definition model defines, based on the one or more hierarchical relationships between the requested data nodes, one or more hierarchical subtrees, where each hierarchical subtree is associated with a respective subtree root data node of the requested data nodes and any requested data nodes that depend from the subtree root data node. In some of those embodiments, the structural similarity measure between the modeling structure of the query definition model and the processing structure of the query processing model is determined based on one or more captured subtree properties of one or more captured subtrees associated with the query processing model. A particular subtree may be deemed captured by a query processing model and/or by a processing structure of a query processing model when the query processing model and/or the processing structure when the query processing model and/or the processing structure includes a retrieved data item associated with the particular subtree.

For example, the query processing model 1300 may be deemed to have captured the subtree consisting of the requested data node 705. As another example, the query processing model 1310 may be deemed to have captured the subtree consisting of the requested data node 703, the subtree consisting of the requested data node 705, the subtree consisting of the requested data node 706, and the subtree consisting of the requested nodes {702, 705, 706}. As a further example, the query processing model 1310 may be deemed to have captured the subtree consisting of the requested data node 703, the subtree consisting of the requested data node 704, the subtree consisting of the requested data node 705, the subtree consisting of the requested data node 706, the subtree consisting of the requested nodes {702, 705, 706}, and the subtree consisting of the requested nodes {701, 702, 703, 704 705, 706}.

In some embodiments, the captured subtree properties of one or more captured subtrees associated with a query processing model include the lowest subtree root hierarchical degree associated with the query processing model. For example, the lowest subtree hierarchical degree of the query processing model 1300 is two (associated with the subtree root node 705), the lowest subtree hierarchical degree of the query processing model 1310 is one (associated with the subtree root node 702), and the lowest subtree hierarchical degree of the query processing model 1320 is zero (associated with the subtree root node 701). In some of those embodiments, determining whether the structural similarity measure for the query processing model satisfies the one or more structural similarity criteria comprises determining whether the lowest hierarchical degree associated with the query processing model is below a subtree node hierarchical degree threshold. For example, given a subtree node hierarchical degree threshold of two, the query processing model 1300 does not satisfy the one or more completeness threshold criteria, while the query processing model 1310 and the query processing model 1320 satisfy the one or more completeness threshold criteria.

In some embodiments, the captured subtree properties of one or more captured subtrees associated with a query processing model include a particular node association count associated with a largest hierarchical subtree in the processing structure. In some embodiments, a size of a hierarchical subtree is determined at least in part based on the node association count of the hierarchical subtree. For example, the subtree consisting of the requested data node 706 has a node association count of one, the subtree consisting of the requested nodes {702, 705, 706} has a node association count of three, and the subtree consisting of the requested nodes {701, 702, 703, 704 705, 706} has a node association count of six. In some of those embodiments, determining whether the structural similarity measure satisfies the one or more structural similarity criteria comprises determining whether the particular node association count for the largest hierarchical subtree in the query processing model satisfies a node association count threshold. For example, given a node association count threshold of four, the query processing model 1300 and the query processing model 1310 do not satisfy the one or more completeness threshold criteria, while the query processing model 1320 satisfies the one or more completeness threshold criteria.

In some embodiments, the captured subtree properties of one or more captured subtrees associated with a query processing model include a particular height measure associated with a tallest hierarchical subtree in the processing structure, where the height of a subtree may be determined based on a number of distinct hierarchical degrees associated with requested nodes in the subtree and a subtree having a higher height measure may be deemed to be taller than a subtree having a lower height measure. For example, the subtree consisting of the requested data node 706 has a height of one, the subtree consisting of the requested nodes {702, 705, 706} has a height of two, and the subtree consisting of the requested nodes {701, 702, 703, 704 705, 706} has a height of three. In some of those embodiments, determining whether the structural similarity measure satisfies the one or more structural similarity criteria comprises determining whether the particular height for the tallest hierarchical subtree in the query processing model satisfies a height threshold. For example, given a height threshold of three, the query processing model 1300 and the query processing model 1310 do not satisfy the one or more completeness threshold criteria, while the query processing model 1320 satisfies the one or more completeness threshold criteria.

In some embodiments, the captured subtree properties of one or more captured subtrees associated with a query processing model include a particular distance associated with a nearest hierarchical subtree in the processing structure, where the distance of a subtree may be determined based on a hierarchical degree of the root node associated with a subtree (i.e., a lowest hierarchical degree of any node associated with a subtree) and a subtree having a lower distance measure may be deemed nearer than a subtree having a higher distance measure. For example, the subtree consisting of the requested data node 706 has a distance of three, the subtree consisting of the requested nodes {702, 705, 706} has a distance of two, and the subtree consisting of the requested nodes {701, 702, 703, 704 705, 706} has a height of one. In some of those embodiments, determining whether the structural similarity measure satisfies the one or more structural similarity criteria comprises determining whether the particular distance for the nearest hierarchical subtree in the query processing model satisfies a distance threshold. For example, given a distance threshold of one, the query processing model 1300 and the query processing model 1310 do not satisfy the one or more completeness threshold criteria, while the query processing model 1320 satisfies the one or more completeness threshold criteria.

Returning to FIG. 12, at operation 1204, the data retrieval computing device 111 transmits a selected portion of the retrieved data items in the query definition model to the query-initiating computing device 110 in response to determining that the model completeness measure for the query processing model satisfies the one or more completeness threshold criteria. In some embodiments, the selected portion of the one or more retrieved data item comprises each retrieved data item of the one or more retrieved data items. In some embodiments, the selected portion of the one or more retrieved data item comprises each retrieved data item of the one or more retrieved data items except for any retrieved data items that were transmitted during a prior transmission of a past partial query output to the query-initiating computing device 110. At operation 1205, the data retrieval computing device 111 does not perform transmissions of the retrieved data items associated with the query processing model in response to determining that the model completeness measure for the query processing model fails to satisfy the one or more completeness threshold criteria.

Returning to FIG. 5, in some embodiments, process 500 may be performed by the incremental rendering engine 131 of a query-initiating software application 121. In at least some of those embodiments, in response to determining that the model completeness measure for an updated query processing model satisfies the one or more completeness threshold criteria, the incremental rendering engine 131 generating one or more user interface elements based on at least a selected portion of the one or more retrieved data items associated with the query processing model. In some of those embodiments, the selected portion of the one or more retrieved data item comprises each retrieved data item of the one or more retrieved data items. In other embodiments, the selected portion of the one or more retrieved data item comprises each retrieved data item of the one or more retrieved data items except for any retrieved data items whose respective user interface elements were generated during a prior generation of user interface elements based on a past partial query output.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method for reducing latency in processing a graph-based data retrieval query in a distributed database environment that comprises a plurality of data sources, the computer-implemented method comprising:
    identifying a query definition model associated with the graph-based data retrieval query, wherein the query definition model comprises a graph-based structure and defines one or more requested hierarchical relationships between a plurality of requested data nodes for the graph-based data retrieval query;
    transmitting a respective data retrieval request to each data source of the plurality of data sources to obtain a per-source portion of the plurality of requested data nodes that is associated with said each data source;
    determining a plurality of source-node pairs that are associated with the plurality of data sources and a requested data node of the plurality of requested data nodes;
    calculating a plurality of per-source node retrieval latency measures associated with the plurality of source-node pairs based on a historic data retrieval latency data table;

comparing the plurality of per-source node retrieval latency measures to identify a selected per-source node retrieval latency measure that indicates an improved latency in processing the graph-based data retrieval query;

retrieving a data item corresponding to the requested data node from one of the plurality of data sources that corresponds to the selected per-source node retrieval latency measure;

generating a query processing model for the graph-based data retrieval query that comprises the data item;

calculating a model completeness measure for the query processing model that indicates a structural similarity measure between a modeling structure of the query definition model and a processing structure of the query processing model based on a hierarchical height measure defined between the data item in the query processing model and a root requested data node in the query definition model;

determining whether the model completeness measure satisfies one or more completeness threshold criteria;

in response to determining that the model completeness measure satisfies the one or more completeness threshold criteria, generating a partial query output for the graph-based data retrieval query based on the data item; and generating one or more user interface elements based at least in part on the partial query output.

2. The computer-implemented method of claim 1, wherein:

the query definition model defines, based on the one or more requested hierarchical relationships, a respective hierarchical degree for each requested data node of the plurality of requested data nodes, each respective hierarchical degree for a corresponding requested data node of the plurality of requested data nodes is determined based on a hierarchical distance of the corresponding requested data node from a root data node of the plurality of requested data nodes, and the structural similarity measure between the modeling structure of the query definition model and the processing structure of the query processing model is determined based on a particular hierarchical degree of one of a plurality of retrieved data items that has a lowest hierarchical degree among the plurality of retrieved data items.

3. The computer-implemented method of claim 2, wherein the structural similarity measure between the modeling structure of the query definition model and the processing structure of the query processing model satisfies the one or more completeness threshold criteria when the particular hierarchical degree is below a hierarchical degree threshold.

4. The computer-implemented method of claim 1, wherein:

the query definition model further defines, based on the one or more requested hierarchical relationships, one or more hierarchical subtrees, each hierarchical subtree of the one or more hierarchical subtrees is associated with a respective subtree root data node of the plurality of requested data nodes and any requested data nodes of the plurality of requested data nodes that depend from the respective subtree root data node, and the structural similarity measure between the modeling structure of the query definition model and the processing structure of the query processing model is determined based on one or more captured subtree properties of one or more captured subtrees associated with the processing structure.

5. The computer-implemented method of claim 4, wherein:

the query definition model further defines, based on the one or more requested hierarchical relationships, a respective hierarchical degree for each requested data node of the plurality of requested data nodes, the one or more captured subtree properties include a particular hierarchical degree of a subtree node associated with the processing structure that is a lowest subtree node associated with the processing structure, and determining whether the structural similarity measure between the modeling structure of the query definition model and the processing structure of the query processing model satisfies one or more structural similarity criteria comprises determining whether the particular hierarchical degree is below a subtree node hierarchical degree threshold.

6. The computer-implemented method of claim 4, wherein:

the one or more captured subtree properties include a particular node association count associated with a largest hierarchical subtree in the processing structure, and determining whether the structural similarity measure between the modeling structure of the query definition model and the processing structure of the query processing model satisfies one or more structural similarity criteria comprises determining whether the particular node association count associated with the largest hierarchical subtree in the processing structure satisfies a node association count threshold.

7. The computer-implemented method of claim 4, wherein:

the one or more captured subtree properties include a particular height measure associated with a tallest hierarchical subtree in the processing structure, and determining whether the structural similarity measure between the modeling structure of the query definition model and the processing structure of the query processing model satisfies one or more structural similarity criteria comprises determining whether the particular height measure associated with the tallest hierarchical subtree satisfies a height threshold.

8. The computer-implemented method of claim 4, wherein:

the one or more captured subtree properties include a particular distance measure associated with a nearest hierarchical subtree in the processing structure, and determining whether the structural similarity measure between the modeling structure of the query definition model and the processing structure of the query processing model satisfies one or more structural similarity criteria comprises determining whether the particular distance measure associated with the nearest hierarchical subtree satisfies a distance threshold.

9. The computer-implemented method of claim 1, further comprising:

determining, for said each data source of the plurality of data sources, a corresponding per-source portion of the plurality of requested data nodes.

10. The computer-implemented method of claim 1, wherein the partial query output comprises a selected portion of one or more retrieved data items, wherein the selected portion of the one or more retrieved data items comprises each retrieved data item of the one or more retrieved data items.

11. The computer-implemented method of claim 1, further comprising transmitting the partial query output to a query-initiating client device.

12. The computer-implemented method of claim 10, wherein the selected portion of the one or more retrieved data items comprises each retrieved data item of the one or more retrieved data items except for any retrieved data items that were transmitted during a prior transmission of a past partial query output to a query-initiating device.

13. The computer-implemented method of claim 12, wherein the selected portion of the one or more retrieved data items comprises each retrieved data item of the one or more retrieved data items except for any retrieved data items whose respective user interface elements were generated during a prior generation of user interface elements based on the past partial query output.

14. An apparatus for reducing latency in processing a graph-based data retrieval query in a distributed database environment that comprises a plurality of data sources, the apparatus comprising at least one processor and at least one non-transitory memory including non-transitory program code, the at least one non-transitory memory and the non-transitory program code configured to, with the at least one processor, cause the apparatus to at least:
identify a query definition model associated with the graph-based data retrieval query, wherein the query definition model comprises a graph-based structure and defines one or more requested hierarchical relationships between a plurality of requested data nodes for the graph-based data retrieval query;
transmit a respective data retrieval request to each data source of the plurality of data sources to obtain a per-source portion of the plurality of requested data nodes that is associated with said each data source;
determine a plurality of source-node pairs that are associated with the plurality of data sources and a requested data node of the plurality of requested data nodes;
calculate a plurality of per-source node retrieval latency measures associated with the plurality of source-node pairs based on a historic data retrieval latency data table;
compare the plurality of per-source node retrieval latency measures to identify a selected per-source node retrieval latency measure that indicates an improved latency in processing the graph-based data retrieval query;
retrieve a data item corresponding to the requested data node from one of the plurality of data sources that corresponds to the selected per-source node retrieval latency measure;
generate a query processing model for the graph-based data retrieval query that comprises the data item;
calculate a model completeness measure for the query processing model that indicates a structural similarity measure between a modeling structure of the query definition model and a processing structure of the query processing model based on a hierarchical height measure defined between the data item in the query processing model and a root requested data node in the query definition model;
determine whether the model completeness measure satisfies one or more completeness threshold criteria;
in response to determining that the model completeness measure satisfies the one or more completeness threshold criteria, generate a partial query output for the graph-based data retrieval query based on the data item; and
generate one or more user interface elements based at least in part on the partial query output.

15. The apparatus of claim 14, wherein:
the query definition model defines, based on the one or more requested hierarchical relationships, a respective hierarchical degree for each requested data node of the plurality of requested data nodes,
each respective hierarchical degree for a corresponding requested data node of the plurality of requested data nodes is determined based on a hierarchical distance of the corresponding requested data node from a root data node of the plurality of requested data nodes, and
the structural similarity measure between the modeling structure of the query definition model and the processing structure of the query processing model is determined based on a particular hierarchical degree of one of a plurality of retrieved data items that has a lowest hierarchical degree among the plurality of retrieved data items.

16. The apparatus of claim 14, wherein:
the query definition model further defines, based on the one or more requested hierarchical relationships, one or more hierarchical subtrees,
each hierarchical subtree of the one or more hierarchical subtrees is associated with a respective subtree root data node of the plurality of requested data nodes and any requested data nodes of the plurality of requested data nodes that depend from the respective subtree root data node, and
the structural similarity measure between the modeling structure of the query definition model and the processing structure of the query processing model is determined based on one or more captured subtree properties of one or more captured subtrees associated with the processing structure.

17. The apparatus of claim 16, wherein:
the query definition model further defines, based on the one or more requested hierarchical relationships, a respective hierarchical degree for each requested data node of the plurality of requested data nodes,
the one or more captured subtree properties include a particular hierarchical degree of a subtree node associated with the processing structure that is a lowest subtree node associated with the processing structure, and
determining whether the structural similarity measure between the modeling structure of the query definition model and the processing structure of the query processing model satisfies one or more structural similarity criteria comprises determining whether the particular hierarchical degree is below a subtree node hierarchical degree threshold.

18. A computer program product for reducing latency in processing a graph-based data retrieval query in a distributed database environment that comprises a plurality of data sources, the computer program product comprising at least one non-transitory computer-readable storage medium having non-transitory computer-readable program code portions stored therein, the non-transitory computer-readable program code portions configured to:
identify a query definition model associated with the graph-based data retrieval query, wherein the query definition model comprises a graph-based structure and defines one or more requested hierarchical relationships between a plurality of requested data nodes for the graph-based data retrieval query;

transmit a respective data retrieval request to each data source of the plurality of data sources to obtain a per-source portion of the plurality of requested data nodes that is associated with said each data source;

determine a plurality of source-node pairs that are associated with the plurality of data sources and a requested data node of the plurality of requested data nodes;

calculate a plurality of per-source node retrieval latency measures associated with the plurality of source-node pairs based on a historic data retrieval latency data table;

compare the plurality of per-source node retrieval latency measures to identify a selected per-source node retrieval latency measure that indicates an improved latency in processing the graph-based data retrieval query;

retrieve a data item corresponding to the requested data node from one of the plurality of data sources that corresponds to the selected per-source node retrieval latency measure;

generate a query processing model for the graph-based data retrieval query that comprises the data item;

calculate a model completeness measure for the query processing model that indicates a structural similarity measure between a modeling structure of the query definition model and a processing structure of the query processing model based on a hierarchical height measure defined between the data item in the query processing model and a root requested data node in the query definition model;

determine whether the model completeness measure satisfies one or more completeness threshold criteria;

in response to determining that the model completeness measure satisfies the one or more completeness threshold criteria, generate a partial query output for the graph-based data retrieval query based on the data item; and generate one or more user interface elements based at least in part on the partial query output.

* * * * *